United States Patent [19]
Eybergen

[11] Patent Number: 5,992,894
[45] Date of Patent: Nov. 30, 1999

[54] PLURAL CONDUIT QUICK-CONNECT

[75] Inventor: William N. Eybergen, Windsor, Canada

[73] Assignee: Eaton Corporation, Cleveland, Ohio

[21] Appl. No.: 09/035,722

[22] Filed: Mar. 5, 1998

[51] Int. Cl.$^6$ .................................................. F16L 35/00
[52] U.S. Cl. ........................... 285/26; 285/304; 285/321; 29/437; 29/469
[58] Field of Search ................................. 285/26, 29, 321, 285/124.1, 124.2, 124.3, 124.4, 124.5, FOR 118; 29/437, 469

[56] References Cited

U.S. PATENT DOCUMENTS

| | | | |
|---|---|---|---|
| 2,707,147 | 2/1955 | Summerville | 285/304 X |
| 2,759,492 | 8/1956 | Benson et al. | 285/26 |
| 3,214,195 | 10/1965 | Zahuranec et al. | 285/124.1 X |
| 4,555,130 | 11/1985 | McClain | 285/26 |
| 4,611,831 | 9/1986 | Truchet | 285/26 |
| 5,354,103 | 10/1994 | Torrence et al. | 285/137.1 |
| 5,417,459 | 5/1995 | Gray et al. | 285/26 |

*Primary Examiner*—Dave W. Arola
*Attorney, Agent, or Firm*—Roger A. Johnston

[57] ABSTRACT

A quick-connect for attaching plural conduits to a fluid communicating ported block or valve. A recess provided in the block face between the ports has an attachment member, received in the recess and retained on the block by through-bolting from the back side of the block. A snap ring is retained between the attachment member and the block. The conduits are prepared with a convolution and an end fitting spaced from the convolution with a seal ring on the end fitting. A retaining plate has the spaced portion of each conduit received in an edge cutout. The retaining plate has a barbed stud mounted between the conduits; and, the conduit ends with seal rings are inserted in the block ports and the stud inserted in a hole in the attachment member to engage the captured snap ring. Removal of the through bolts from the backside is required for disassembly.

8 Claims, 1 Drawing Sheet

PLURAL CONDUIT QUICK-CONNECT

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to the connection of conduits to a junction or block, and particularly relates to the connection of plural conduits to a valve block. An example of such connections is that utilized in connecting conduits or tubes in a refrigeration system such as an automobile air conditioning system to an expansion valve block. In high volume mass production of motor vehicles, it is desired to minimize assembly time and to provide for connection of hoses, harnesses, conduits and the like without the need for fasteners or tools in the vehicle assembly operations. In particular, it is desired in the automotive air conditioning systems to be able to connect the conduits or tubes from the evaporator to the expansion valve block by a quick-connect without the need for separate fasteners installed at assembly. The requirement that separate fasteners be needed to install the conduits to the valve block, or that threaded tube fittings be engaged with the block using spanners or wrenches has proven to be prohibitively costly and time consuming in high volume assembly as is encountered in motor vehicles.

Heretofore, threaded type tube fittings have been provided on the ends of the conduits which required corresponding threads be provided in the valve block; and, spanners or wrenches were required at assembly to manually engage and then tighten the threaded tube fittings with respect to the valve block which was deemed to be relatively time consuming and costly. Accordingly, it has been desired to provide a way or means of quick-connecting plural conduits to a block, such as a refrigerant expansion valve block, without the need for threaded engagement of tube fittings or separate fasteners.

BRIEF SUMMARY OF THE INVENTION

The present invention provides for quick-connecting a plurality of conduits or tubes to a fluid communicating ported block, such as a valve block, and particularly a refrigerant expansion valve block, in a manner which requires no tools or threading of tube fittings into the block at the time of assembly. Although the quick-connect of the present invention is non-releasable, provision is made for removal of the connection by removal of threaded fasteners provided separately in pre-assembly on the valve block in the event that disassembly is required for service after the original installation.

The block or valve in the present invention is a pre-assembled with a removable attachment member which is bolted to the block from the reverse side. The attachment member has an aperture with a snap ring trapped against the block on the reverse side of the attachment member; and, the snap ring is not otherwise accessible from the front face of the block; but is lockingly engaged through the aperture in the attachment member. The plural conduits to be connected to the block have annular ribs such as convolutions formed thereon and end fittings pre-assembled thereon adjacent the ends thereof and spaced from the annular ribs. A retaining plate has plural edge cutouts with the portion of one of the conduits between the annular rib and end fitting received in each cutout. The retaining plate has on the front or attachment side thereof a grooved or annularly barbed stud extending therefrom. At assembly ends of the conduits with pre-assembled seal rings thereon are inserted in the block ports and the retaining plate is pressed against the surface of the block such that the stud engages the snap ring retained on the backside of the block attachment member thus securing the retaining plate and conduits to the block with the sealing rings received in the fluid communicating ports provided on the block.

In the event that removal of the conduit installation is subsequently required for service, the threaded fasteners are accessed from the back surface of the block and unthreaded from the attachment member which is then removed from the block along with the retaining plate and conduits. The snap ring may then be disengaged from the stud to remove the attachment member for reassembling to the block.

The present invention thus provides a simple yet economical way of quick-connecting plural conduits to a block or valve with a snap-in connection and yet provides for disassembly later if removal of the conduits from the block is required for service or replacement.

DETAILED DESCRIPTION OF THE INVENTION

Figure 1:
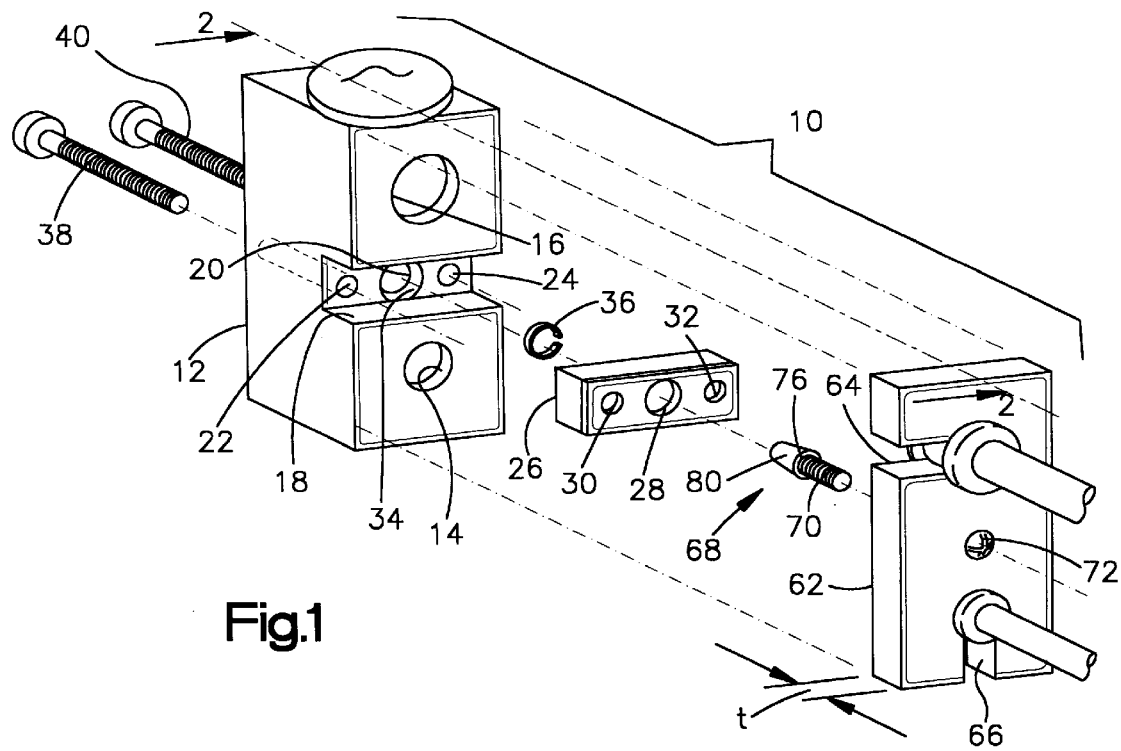
FIG. 1 is an exploded view of the assembly of the present invention.
Figure 2:
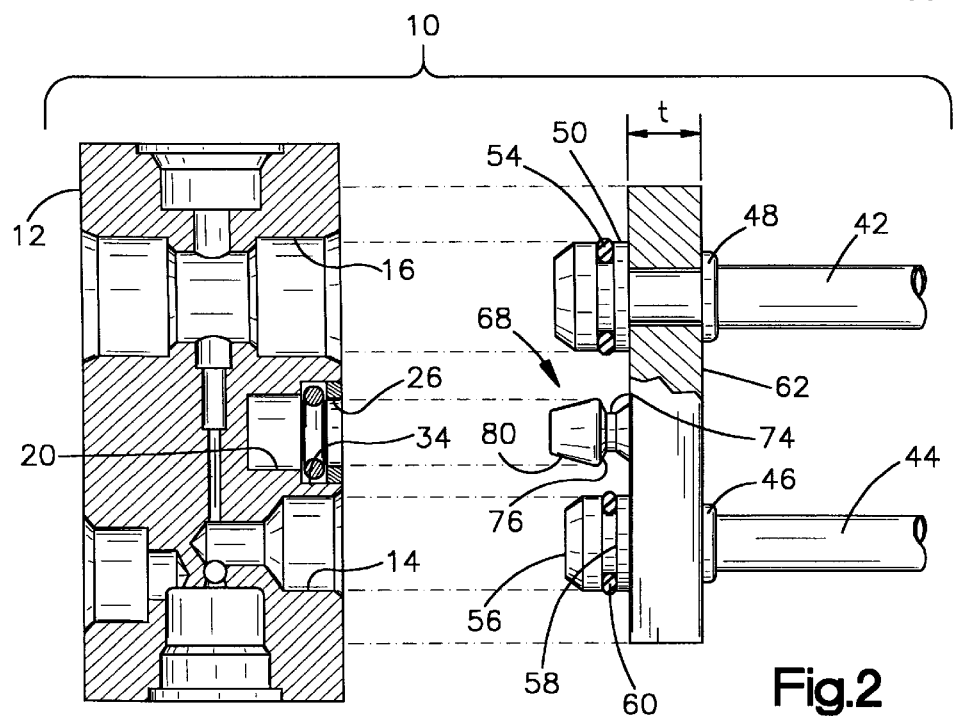
FIG. 2 is a section view taken along section indicating lines 2—2 of FIG. 1; and, FIG. 3 is a detail of the pre-assembled end of one of the conduits.

Referring to FIGS. 1 and 2, the assembly of the present invention is indicated generally at 10 and includes a block 12 having a plurality of fluid flow ports 14, 16 formed in a common side or face thereof which are adapted for fluid flow through the block 12.

In the illustrated embodiment, the block 12 comprises a thermostatic expansion valve block or body; and, the port 14 comprises the valve outlet on the low pressure side adapted for discharge to a refrigerant evaporator, whereas, the port 16 is adapted to receive return flow from the evaporator outlet.

A groove or recess 18 is formed in the face or the side of the block common with ports 14, 16; and, the groove extends transversely between the ports 14, 16 and has a centrally disposed clearance bore 20 formed in the bottom of the groove. A pair of through bores 22, 24 are disposed in the bottom of groove 18 extend through the block with one of the bores disposed on either side of the clearance bore 20.

An attachment member 26 is sized and configured to be received in the groove 18 with the outer surface thereof generally flush with the side of the block common with ports 14, 16. Member 26 has a centrally disposed clearance bore 28 therethrough with a plurality of threaded apertures 30, 32 disposed respectively on opposite sides of bore 28 and are located to align respectively with the block bores 22, 24. The clearance bore 24 in block 12 is relieved in a counter bore 34 which has received therein a snap ring 36 and which is retained in the counter bore 34. Attachment member 26 is threadedly engaged by bolts 38, 40 respectively received through bores 22, 24 and which engage the threaded bores 30, 32 in the member 26, thereby securing the member 26 in groove 18 and trapping the snap ring 36 behind the member 26.

Figure 3:
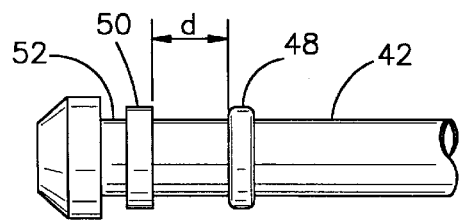

The assembly 10 includes a plurality of pre-assembled conduits 42, 44 one of which denoted by reference numeral 42 is shown in FIG. 3. The conduit 42 has the end thereof prepared with an annular rib or convolution 48 formed thereon and with an end fitting 50 provided thereon which has an annular groove 52 formed therein into which is received a resilient seal ring 54 as shown in FIG. 2. It will be understood that the conduit 44 is prepared in a similar manner having an annular rib or convolution 54 formed thereon with an end fitting 56 with an annular groove 58 having a seal ring 60 received therein.

A retaining plate 62 has a pair of edge cutouts 64, 66 configured and located on the plate 62 such that the conduit 42 may be received in cutout 64; and, conduit 44 is received in cutout 66. It will be understood that the distance between rib 48 and end fitting 50 as denoted by reference character "d" in FIG. 3 corresponds to the thickness of the retaining plate 60 as denoted by reference character "t", such that the surfaces of the ribs 48, 54 and end fittings 50, 56 respectively abut the opposite faces of the plate 62. It will be further understood that the width of the cutout 64, 66 corresponds respectively to the outer diameter of the conduits 42, 44.

An attachment stud, indicated generally at 68, has a threaded shank 70 which is threadedly engaged in a threaded bore 72 provided in the retaining plate 62; and, the threaded bore 72 is located on the retaining plate 62 to align with the bore 28 in the attachment member 26.

The attachment stud 68 has an annular groove 74 formed therein to provide an annular chamfer or barb 76; and, the end of the stud 68 has a tapered section 80. Upon insertion of the tapered section 80 of stud 68 into the bore 20 the snap ring 36 is cammed over the tapered surface and the ring is permitted to close into the groove 74 whereby the plate 62 is retained against the block 12 with the seal ring 54 engaging port 16 and port 14.

In the presently preferred practice the cutouts 64, 66 are arranged on retaining plate 62 so as to be opened at right angles to each other, such that upon attachment of the plate 62 to the block 12 an engagement of the ends of the conduits 50, 56 into the ports 16, 14 the plate 62 is locked into position and may not be rotated or removed from the side of the block containing ports 16, 14.

However, in the event of the need for repair or replacement of either the valve block 12 or other components of the system, the threaded fasteners 38, 40 may be removed from the backside of the block 12 permitting the attachment member 28 and plate 62 and stud 68 to be removed as a subassembly. After such removal, the snap ring 36 may be removed and the attachment member 26 removed from stud 68 and reassembled onto the block to permit reinstallation of the retaining plate onto the valve block.

The present invention thus provides a unique and novel technique for quick-connecting a plurality of conduits to a block, and particularly a valve block, in a manner which does not require tools or the threading of fittings at installation and thereby provides a low cost and time saving method of attachment. The technique of the present invention provides for disassembly in the event of need for repair by removal of fasteners accessible only from the reverse side of the block.

Although the invention has hereinabove been described with respect to the illustrated embodiments, it will be understood that the invention is capable of modification and variation and is limited only by the following claims.

I claim:

1. A method of attaching a plurality of conduits to a ported block comprising:

(a) forming a plurality of spaced apertures in a plate and inserting one of said conduits through each aperture and forming a projection on each conduit on opposite sides of said plate and retaining said conduits on said plate;

(b) extending a stud from one side of said plate;

(c) disposing a snap ring over a cut-out on an attachment member and releasably attaching said member to said block; and, inserting said stud through said cut-out and engaging said snap ring over said stud and retaining said plate on said block and communicating said conduits with said block ports.

2. The method defined in claim 1, wherein said step of forming a projection includes forming an annular rib.

3. The method defined in claim 1, wherein said step of forming a projection includes forming a convolution in the wall of each conduit.

4. The method defined in claim 1, wherein said step of releasably attaching includes bolting said member through said block.

5. A quick connect assembly for a plurality of conduits comprising:

(a) a block having a plurality of spaced fluid ports formed therein;

(b) an attachment member and means releasably fastening said member to said block, said member having a cut-out therein with a resiliently deflectable member disposed adjacent said cut-out;

(c) a plate having a plurality of spaced apertures therein with one of said conduits received through each of said apertures;

(d) a projection on each of said conduits disposed on opposite sides of said plate and retaining said conduit in said plate aperture;

(e) a stud extending from one side of said plate and including engagement surfaces thereon; and, wherein said stud is inserted in said attachment member cut-out with said stud engagement surfaces engaged by said resiliently deflectable member for retaining said plate on said block with said conduits each communicating with one of said fluid ports.

6. The assembly defined in claim 5, wherein said resiliently deflectable member comprises a snap ring.

7. The assembly defined in claim 5, wherein said projection on each of said conduits comprises an annular rib.

8. The assembly defined in claim 5, wherein said stud engagement surfaces includes an annular recess.

* * * * *